US010056048B2

(12) United States Patent
Kim (10) Patent No.: US 10,056,048 B2
(45) Date of Patent: Aug. 21, 2018

(54) DOUBLE-SIDED DISPLAY DEVICE

(71) Applicant: TOVIS CO., Ltd., Incheon (KR)

(72) Inventor: Yong Beom Kim, Incheon (KR)

(73) Assignee: TOVIS CO., Ltd., Incheon (KR)

( * ) Notice: Subject to any disclaimer, the term of this patent is extended or adjusted under 35 U.S.C. 154(b) by 0 days.

(21) Appl. No.: 15/108,578

(22) PCT Filed: Dec. 1, 2014

(86) PCT No.: PCT/KR2014/011625
§ 371 (c)(1),
(2) Date: Jun. 28, 2016

(87) PCT Pub. No.: WO2015/105279
PCT Pub. Date: Jul. 16, 2015

(65) Prior Publication Data
US 2016/0322007 A1    Nov. 3, 2016

(30) Foreign Application Priority Data

Jan. 7, 2014    (KR) .......................... 10-2014-0001894

(51) Int. Cl.
*G09G 3/36*    (2006.01)
*F21V 8/00*    (2006.01)
(Continued)

(52) U.S. Cl.
CPC .............. *G09G 3/36* (2013.01); *G02B 6/0016* (2013.01); *G02F 1/133512* (2013.01);
(Continued)

(58) Field of Classification Search
None
See application file for complete search history.

(56) References Cited

U.S. PATENT DOCUMENTS 7,843,443 B2 * 11/2010 Oki ...................... G06F 17/212
345/204
2003/0231483 A1 * 12/2003 Higashiyama ....... G02B 6/0038
362/610
(Continued)

FOREIGN PATENT DOCUMENTS

JP    2006-337840 A    12/2006
JP    2007-065690 A    3/2007
(Continued)

OTHER PUBLICATIONS

International Search Report for PCT/KR2014/011625 dated Jan. 21, 2015 from Korean Intellectual Property Office.

*Primary Examiner* — Peijie Shen
(74) *Attorney, Agent, or Firm* — Revolution IP, PLLC (57) ABSTRACT

Disclosed is a double-sided display device which comprises a display panel that has a plurality of pixels arranged in a matrix form and displays an image; a blank means that blanks out some pixels on one surface of the display panel with an arbitrary pattern to prevent an image which the pixels display from being shown and blanks out other pixels, except for the pixels blanked out with the arbitrary pattern, on the other surface of the display panel; and a conversion unit that makes a conversion such that the left and right sides of the image displayed through the pixels blanked out by the blank means and the image displayed through the pixels which are not blanked out are reversed with respect to the one surface of the display panel, and provides the converted images to the display panel.

10 Claims, 8 Drawing Sheets

(51) Int. Cl.
*G02F 1/1335* (2006.01)
*G02F 1/1333* (2006.01)

(52) U.S. Cl.
CPC .. *G02F 1/133528* (2013.01); *G02F 1/133553* (2013.01); *G02F 2001/133342* (2013.01); *G02F 2001/133562* (2013.01); *G02F 2001/133567* (2013.01); *G02F 2202/28* (2013.01); *G09G 2310/062* (2013.01)

(56) References Cited

U.S. PATENT DOCUMENTS

| | | | | |
|---|---|---|---|---|
| 2004/0008506 | A1* | 1/2004 | Son | G02B 6/0051 362/615 |
| 2004/0100423 | A1* | 5/2004 | Nagakubo | G02B 6/0055 345/40 |
| 2004/0189901 | A1* | 9/2004 | Kim | G02F 1/1335 349/114 |
| 2005/0105021 | A1* | 5/2005 | Lee | G02F 1/133553 349/113 |
| 2006/0092355 | A1* | 5/2006 | Yang | G02F 1/133555 349/114 |
| 2006/0181769 | A1* | 8/2006 | Kumasawa | G03B 21/604 359/449 |
| 2006/0285214 | A1* | 12/2006 | Haga | B29D 11/00278 359/619 |
| 2007/0121035 | A1* | 5/2007 | Lee | G02F 1/133553 349/113 |
| 2007/0127227 | A1* | 6/2007 | Osawa | G09F 9/302 362/23.18 |
| 2008/0101087 | A1 | 5/2008 | Hwang et al. | |
| 2008/0151045 | A1* | 6/2008 | Kida | G06F 3/017 348/61 |
| 2009/0278452 | A1* | 11/2009 | Kim | H01L 25/048 313/504 |
| 2010/0097823 | A1* | 4/2010 | Chang | G02B 6/0063 362/606 |
| 2011/0148944 | A1* | 6/2011 | Kobayashi | G09G 3/3225 345/690 |
| 2013/0271378 | A1* | 10/2013 | Hulford | G06F 3/14 345/168 |
| 2013/0343032 | A1* | 12/2013 | Lee | G02B 5/3083 362/19 |
| 2014/0197388 | A1* | 7/2014 | Zhang | H01L 51/5271 257/40 |
| 2015/0309244 | A1* | 10/2015 | Kim | G02B 6/0076 362/616 |
| 2016/0254336 | A1* | 9/2016 | Zhang | G02F 1/134309 349/33 |
| 2016/0276616 | A1* | 9/2016 | Zhan | H01L 51/524 |

FOREIGN PATENT DOCUMENTS

JP 2007-183559 A 7/2007
KR 10-0785025 B1 12/2007

* cited by examiner

DOUBLE-SIDED DISPLAY DEVICE

CROSS REFERENCE TO PRIOR APPLICATIONS

This application is a National Stage Application of PCT International Patent Application No. PCT/KR2014/011625 filed on Dec. 1, 2014, under 35 U.S.C. § 371, which claims priority to Korean Patent Application No. 10-2014-0001894 filed on Jan. 7, 2014, which are all hereby incorporated by reference in their entirety.

TECHNICAL FIELD

The present invention relates to a double-sided display device in which images can be watched on both sides thereof.

BACKGROUND ART

In general, a display device is a device for outputting an image. There has recently been disclosed a double-sided display device in which images can be watched on both sides thereof.

A conventional double-sided display device has been disclosed in Korean Patent No. 10-0785025 (Dec. 5, 2007).

The conventional double-sided display device is configured to include a lighting device for providing light to both sides and a first display and a second display disposed to face the both sides of the lighting device, respectively.

In the conventional double-sided display device having such a configuration, images can be watched on the both sides because the one lighting device is shared by the first display and the second display.

However, the conventional double-sided display device is problematic in that a manufacturing cost is high and a thickness is thick because the two sheets of displays are attached to the one lighting device.

DISCLOSURE

Technical Problem

The present invention has been made keeping in mind the above problems occurring in the prior art, and an object of the present invention is to provide a double-sided display device which reduces a manufacturing cost and has a relatively thin thickness by implementing the double-sided display device using one display panel.

Technical Solution

A double-sided display device according to an embodiment of the present invention for achieving the above object includes a display panel in which a plurality of pixels is arranged in a matrix form to display an image, blank means which performs blank processing on pixels in a specific pattern so that an image displayed by some of pixels in one side of the display panel is not seen and which performs blank processing on the remaining pixels other than the pixels on which the blank processing has been performed in the specific pattern in the other side of the display panel, and a conversion unit which converts an image displayed in pixels on which blank processing is performed by the blank means and an image displayed in pixels on which the blank processing is not performed based on the one side of the display panel so that a left and right of the image are reversed and which provides the converted images to the display panel.

A line subjected to blank processing and a line not subjected to blank processing may be alternately disposed in the one side or other side of the display panel and may form the specific pattern.

The specific pattern may be formed so that any one of odd-numbered horizontal lines and even-numbered horizontal lines formed by the pixels in the one side or other side of the display panel is subjected to blank processing.

The conversion unit may convert an image signal included in a scan line for displaying an image on the display panel or may convert an image itself so that the left and right of the image are reversed.

The blank means may further include a light diffusion unit on which the light of the image displayed in the pixels not subjected to the blank processing is incident and which diffuses the light to the outside of the blank means.

The blank means may further include a reflection surface having a side which faces the display panel and which reflects light.

The blank means may be coated on the display panel by paints or may be bonded on the display panel by an adhesive tape.

The display panel may further include a polarization plate or a film attached to the display panel. The blank means may be printed on the polarization plate or the film.

The double-sided display device may further include a light source which is provided on any one of or both the sides of the display panel and provides light to the display panel.

The light source may further include a light guide plate having a diffusion pattern formed therein so that the light guide plate diffuses light of the light source and provides the diffused light to the display panel.

The blank means may be printed on the light guide plate.

Advantageous Effects

In accordance with the present invention, a double-sided display device can be easily implemented using one display panel. A cost for manufacturing a double-sided display device can be significantly reduced because one display panel is used. Furthermore, the thickness of the double-sided display device can be minimized.

Furthermore, the generation of a boundary attributable to blank means is minimized because the light diffusion unit is included in the blank means, and thus an image having sharper picture quality can be provided.

[Description of Reference Numerals]

| | |
|---|---|
| 100: double-sided display device | 110: display panel |
| 111: front side | 112: back side |
| 113: pixel | 115: horizontal line |
| 117: vertical line | 130: light source |
| 135: light guide plate | 150: blank means |
| 151: reflection surface | 153: light diffusion unit |
| 170: conversion unit | |

MODE FOR INVENTION

First, in this specification, blank processing means processing for visually blocking an image so that the image is covered and not seen when a display panel 110 is viewed in order to watch the image.

Furthermore, blank means 150 to be described later is means for performing the aforementioned blank processing and may be implemented using paints or an adhesive tape, for example, but any others capable of performing the blank processing may be used as the blank means.

In a double-sided display device 100 of the present invention, the blank means 150 is alternately installed on the front side 111 and back side 112 of the display panel 110. An image displayed on a portion of any one side on which the blank means 150 has been installed and an image displayed on a portion of the one side on which the blank means 150 has not been installed are reversed left and right and provided. Accordingly, a front side viewer and a back side viewer can watch the same image through the one display panel 110.

That is, the front side viewer and the back side viewer can watch an image because a screen is formed of portions on which blank processing has not been performed by the blank means 150 on the front side 111 and back side 112 of the display panel 110. The blank means 150 alternately perform blank processing on the front side 111 and back side 112 of the display panel 110. An image played back in pixels of any one of the front side 111 and back side 112 of the display panel 110, which are subjected to blank processing by the blank means 150, and an image played back in pixels of the any one, which are not subjected to blank processing by the blank means 150, are converted while passing through a conversion unit 170 so that the left and right of the image are reversed, and are then provided to the display panel 110. Accordingly, the front side viewer and the back side viewer may watch the same image in a normal state or different images.

In this case, depending on the type of display panel 110, in the case of a common Liquid Crystal Display (LCD) incapable of self-light emission, an image can be watched by natural light outdoors, but the light source 130 of the display panel 110 may be further included so that a clearer image can be watched.

Embodiments of the present invention are described below with reference to the accompanying drawings.

Figure 1:
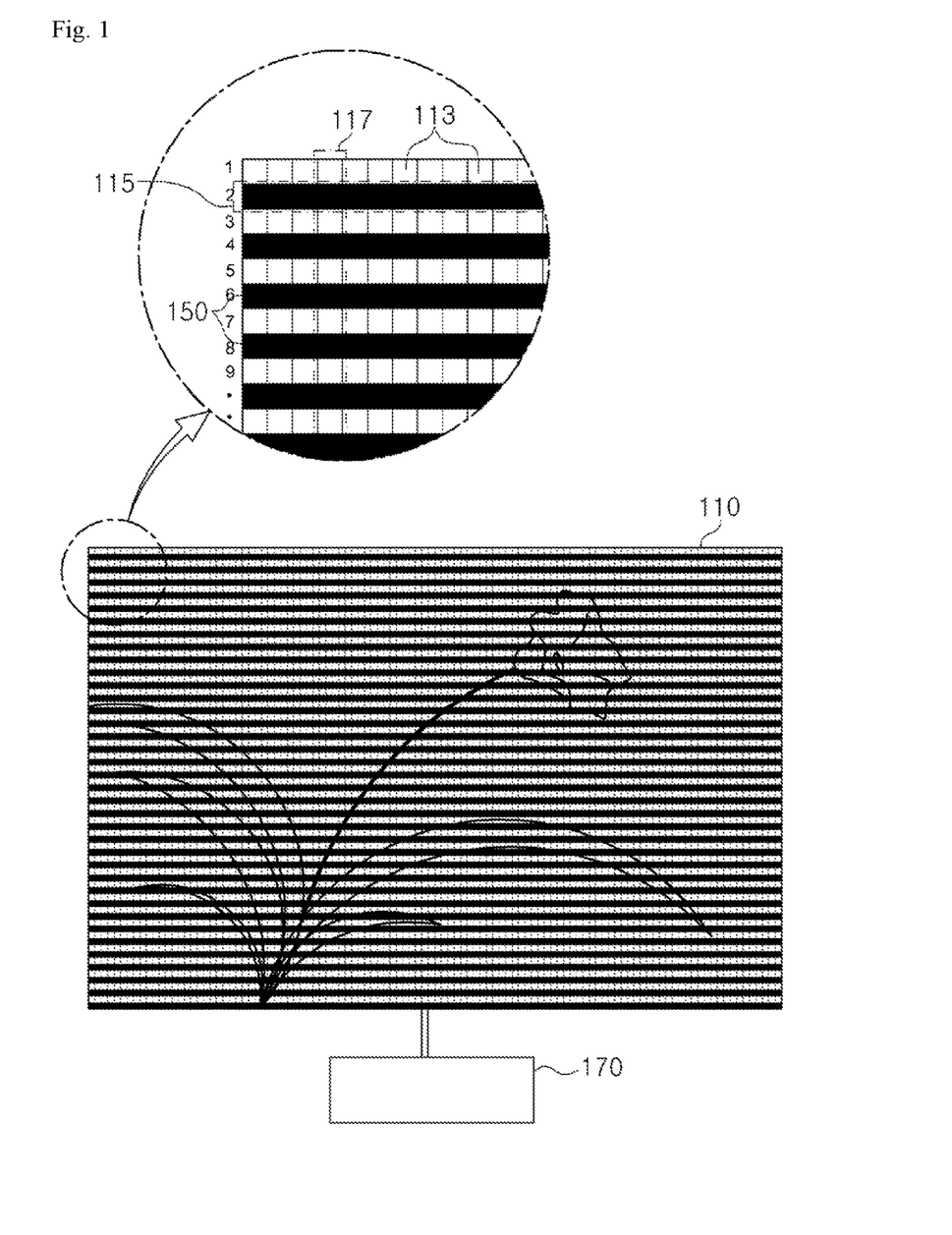
FIG. 1 is a front view schematically showing a double-sided display device according to an embodiment of the present invention.
Figure 5:
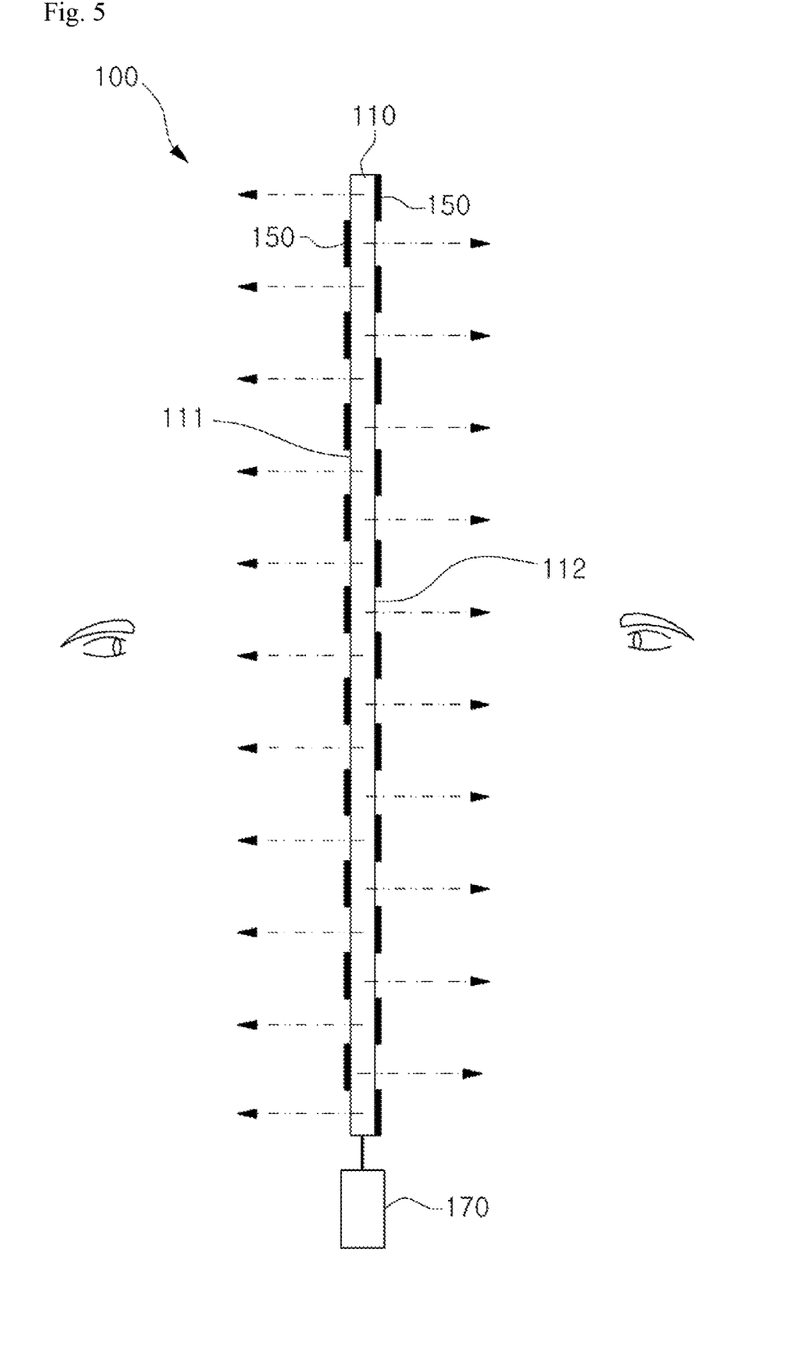
FIG. 5 is a side view schematically showing the double-sided display device according to an embodiment of the present invention.

As shown in FIGS. 1 and 5, the double-sided display device according to an embodiment of the present invention may include the display panel 110.

The display panel 110 can display an image provided by an image providing device, for example, a DVD player, a CD player, a TV receiver, a set-top box, or a computer.

Meanwhile, the display panel 110 may be configured in such a manner that sub-pixels or a cell of an RGB unit forms a single pixel 113 and a plurality of the pixels 113 is arranged in a matrix form.

In this case, in the display panel 110, pixels disposed on a horizontal line are called a horizontal line 115, and pixels disposed on a vertical line are called a vertical line 117.

Furthermore, the display panel 110 may be a self-emission display panel not having a separate light source, such as an OLED panel, a plasma panel or a PLED panel.

The display panel 110 may be a common LCD not the self-emission display panel. If the display panel 110 may be a common LCD, an image may be watched using outdoor natural light or an indoor light as a light source.

Furthermore, the display panel 110 may be a transparent display panel 110 in which images may be watched on both the front side 111 and the back side 112 thereof.

Furthermore, the display panel 110 may further include a variety of types of electrodes, a polarization plate, and a color correction filter. A film for protecting the display panel 110 may be attached to the front side 111 and back side 112 of the display panel 110.

Furthermore, the display panel 110 may include a driving circuit unit for driving the display panel 110.

Figure 6:
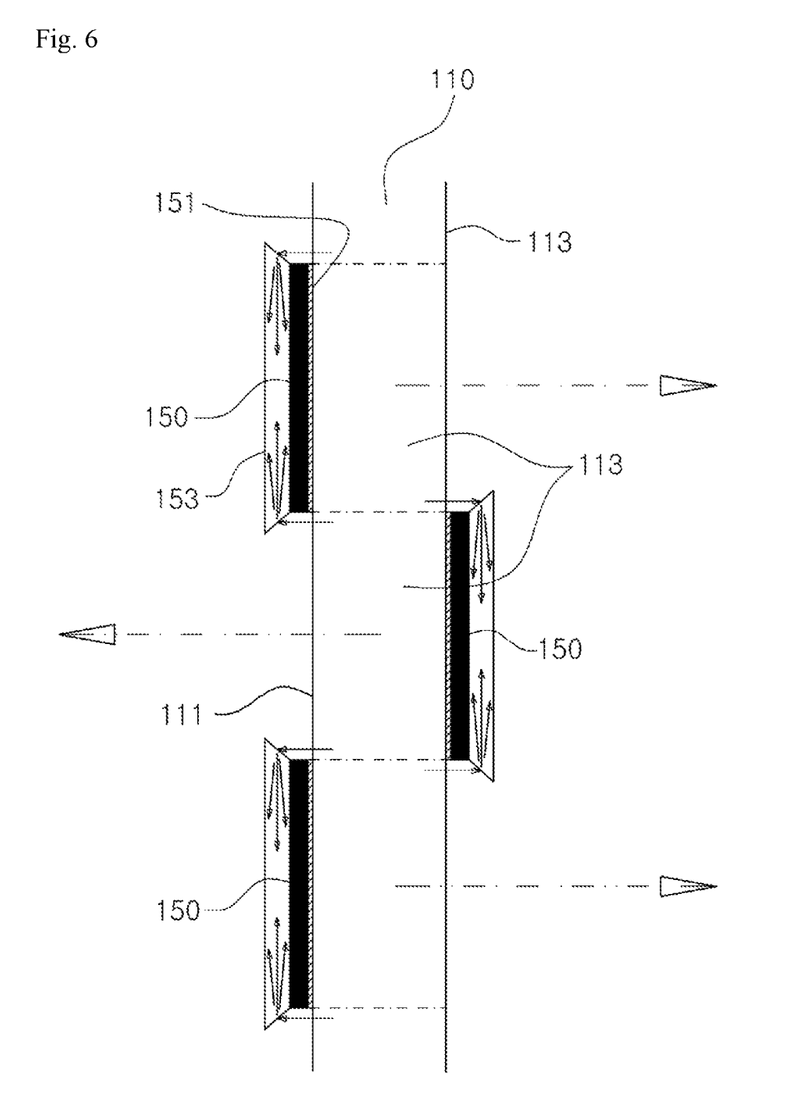
FIG. 6 is an enlarged view for illustrating the blank means forming the double-sided display device of the present invention.

As shown in FIG. 6, the double-sided display device 100 according to an embodiment of the present invention may include the blank means 150.

The blank means 150 may be alternately disposed on the front side 111 and back side 112 of the display panel 110, and may perform blank processing.

That is, the blank means 150 may alternately perform blank processing on the front side 111 and back side 112 of the display panel 110 in such a way as to perform blank processing on a plurality of the pixels 113 in a specific pattern in one of the front side and back side of the display panel 110 and to perform blank processing on the remaining pixels 113 other than the specific pattern in the other of the front side and back side of the display panel 110.

Figure 2:
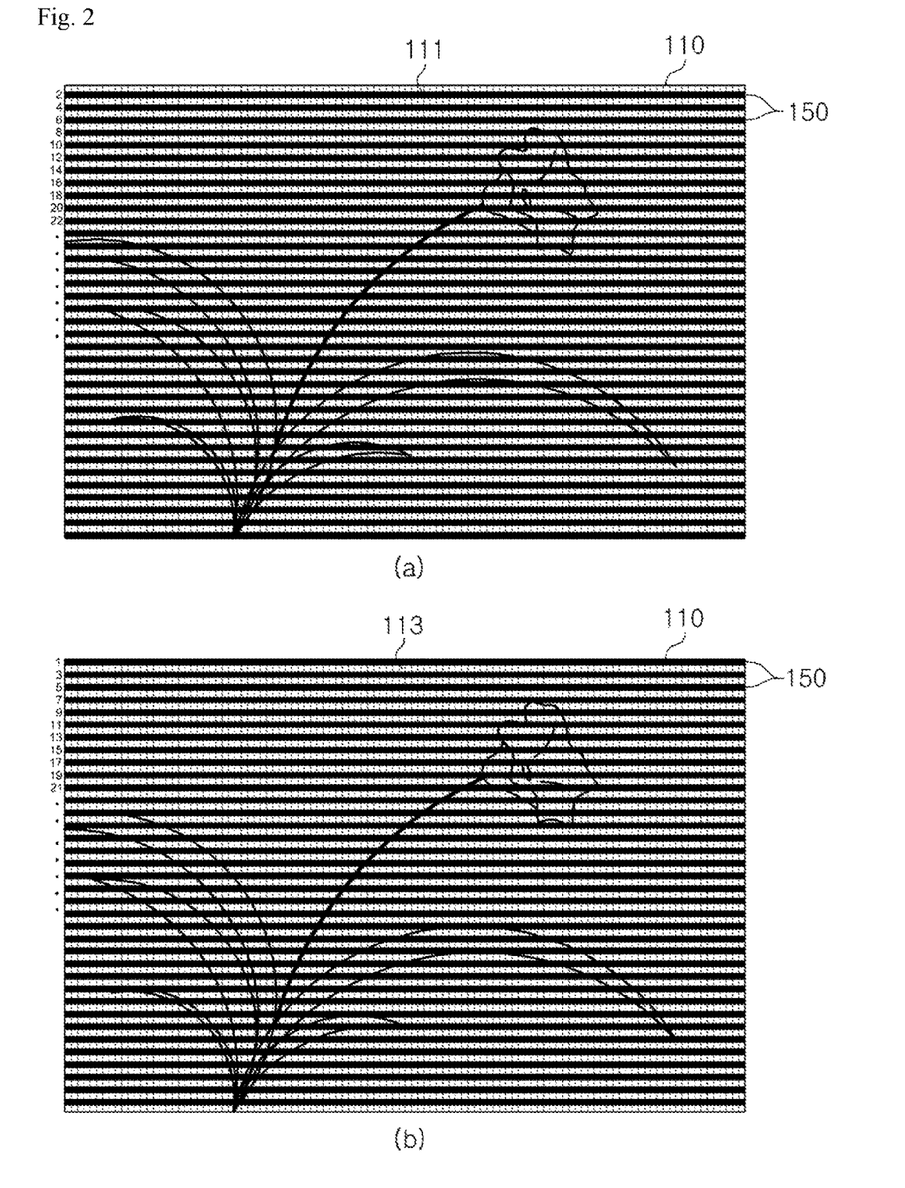
FIG. 2(a) is a diagram showing the front side of the double-sided display device according to an embodiment of the present invention.
FIG. 2(b) is a diagram showing the back side of the double-sided display device.

For example, as in an embodiment shown in FIG. 2, the blank means 150 may be installed to have a specific pattern so that it performs blank processing on the even-numbered horizontal lines of the front side of the display panel 110 and performs blank processing on the odd-numbered horizontal lines of the back side of the display panel 110.

In this case, the specific pattern formed by the blank means 150 means a form in which the blank means 150 has been arranged regularly or irregularly so that blank processing is performed on some pixels in one of the front side and back side of the display panel 110 and blank processing is not performed on the remaining some pixels.

Figure 3:
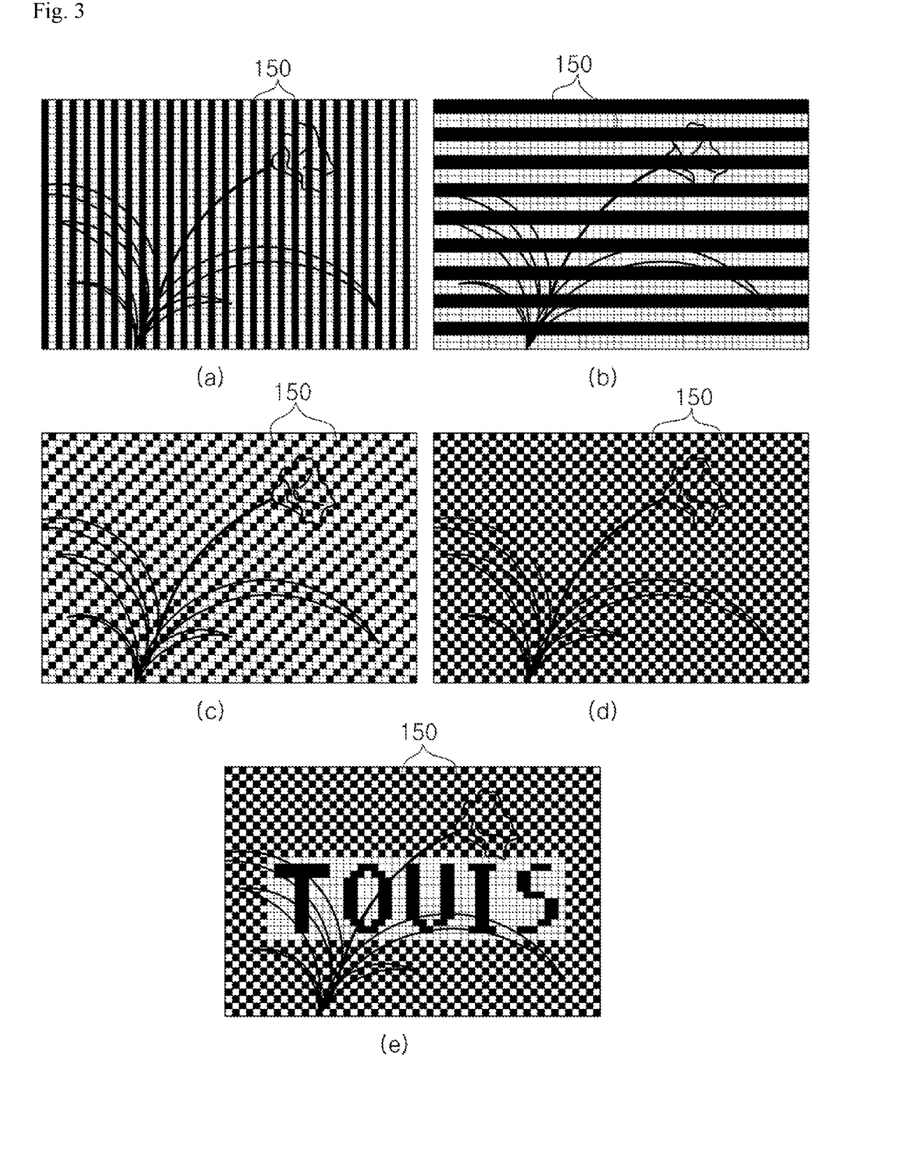
FIG. 3 is a diagram showing various patterns of blank means forming the double-sided display device according to an embodiment of the present invention.

Meanwhile, as in embodiments, the specific pattern formed by the blank means 150 may have a pattern (refer to FIG. 2) configured so that only the pixels of the even-numbered horizontal lines or the odd-numbered horizontal lines are covered as shown in FIG. 3(*a*), a pattern configured so that only the pixels the even-numbered vertical lines or the odd-numbered vertical lines are covered as shown in FIG. 3(b), a pattern configured so that the pixels of a plurality of horizontal lines or the pixels of a plurality of vertical lines are grouped into one and are covered at a specific interval as shown in FIG. 3(c), a pattern configured so that only pixels placed in diagonal lines spaced apart from each other at a specific interval are covered as shown in FIG. 3(d), a pattern configured so that pixels are covered in a mosaic form as shown in FIG. 3(e), or a pattern configured so that pixels are covered in a specific pattern form or a form, such as a number, a letters, or a mark.

In this case, the blank means 150 may form a pattern so that blank processing is performed on only about 50% of the pixels 113 in the front side or back side of the display panel 110.

Furthermore, the blank means 150 may include a reflection surface 151 so that a surface where the blank means 150 comes in contact with the display panel 110 reflects light.

Meanwhile, the blank means 150 may be formed by printing it on the display panel 110 using paints and may also be configured in such a way as to attach an adhesive tape to the display panel 110.

Furthermore, the blank means 150 may be printed on a film for protecting the display panel 110 and the attached to the glass surface of the display panel 110 or a polarization plate attached to the display panel 110. The blank means 150 may also be configured in such a way as to be printed on a polarization plate itself.

Furthermore, the blank means 150 may include a light diffusion unit 153. The light diffusion unit 153 may receive the light of an image displayed in a pixel 113 on which blank processing is performed by the blank means 150 and the light of an image displayed in a pixel which is disposed over or below the pixel 113 on which the blank processing is performed and on which blank processing is not performed, and may diffuse the received light to the blank means 150 so that a boundary partitioned by the blank means 150 in a screen of the display panel 110 becomes ambiguous.

In this case, the light diffusion unit 153 may be partially protruded upward and downward from the blank means 150 so that the light of the image displayed in the pixel 113 on which blank processing is not performed is incident on the light diffusion unit 153.

The double-sided display device 100 according to an embodiment of the present invention may include the conversion unit 170.

Figure 4:
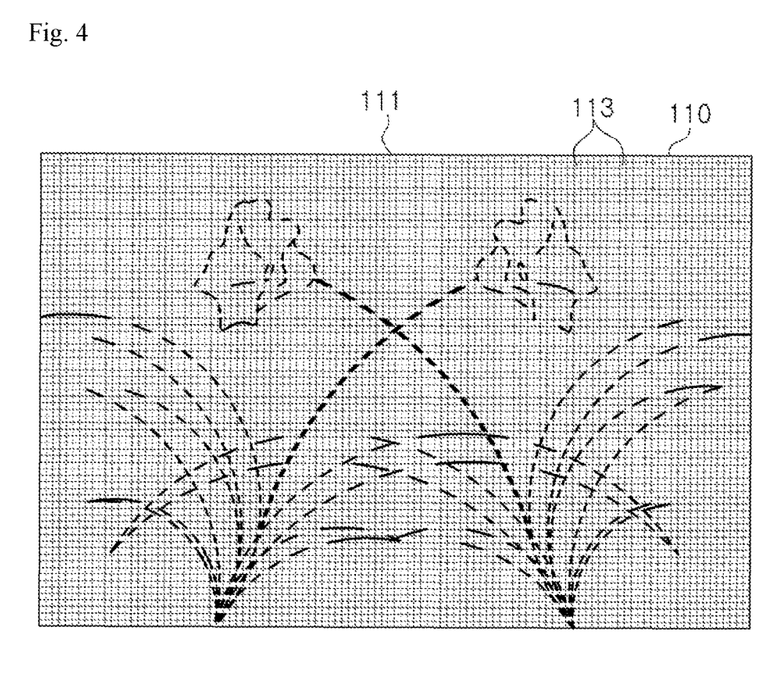
FIG. 4 is a diagram showing an image converted by a conversion unit in the state in which blank means has been removed in the double-sided display device according to an embodiment of the present invention.

As shown in FIG. 4, the conversion unit 170 may convert an image displayed in the pixel of a portion in which the blank means 150 is placed and on which blank processing is performed and an image displayed in the pixel of a portion on which blank processing is not performed based on any one of the front side and back side of the display panel 110 so that the left and right of the image are reversed, and may provide the converted images to the display panel 110.

Meanwhile, the conversion unit 170 may convert an image signal included in a scan line for displaying an image on the display panel 110 so that the left and right of the image are reversed, or may convert an image so that the image itself is converted. The conversion unit 170 may convert an image or an image signal so that the left and right of an image are not reversed, but different images are displayed.

In this case, assuming that an image displayed on one of the front side 111 and back side 112 of the display panel 110 is a normal image, the conversion unit 170 may convert an image displayed in a pixel 113 on which blank processing is not performed by the blank means 150 based on the one of the front side 111 and the back side 112 so that the image is provided as a normal image, and may convert an image displayed in a pixel 113 on which the blank processing is performed by the blank means 150 so that an image having the left and the right reversed is displayed.

Meanwhile, the conversion unit 170 may be included in the driving circuit unit for driving the display panel 110. The conversion unit 170 may be implemented in such a way as to design and fabricate an FPGA, a timing controller, or a dedicated IC.

Figure 7:
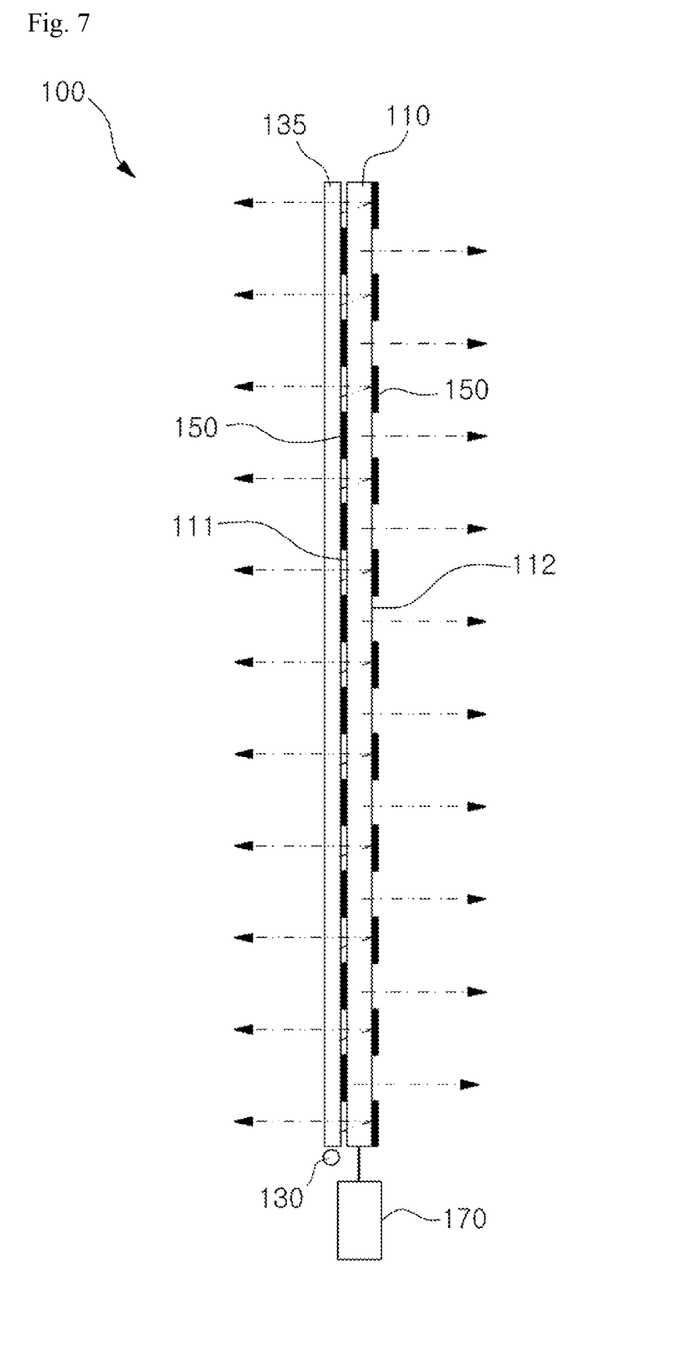
FIG. 7 is a side view schematically showing an example of a light source forming the double-sided display device of the present invention.
Figure 8:
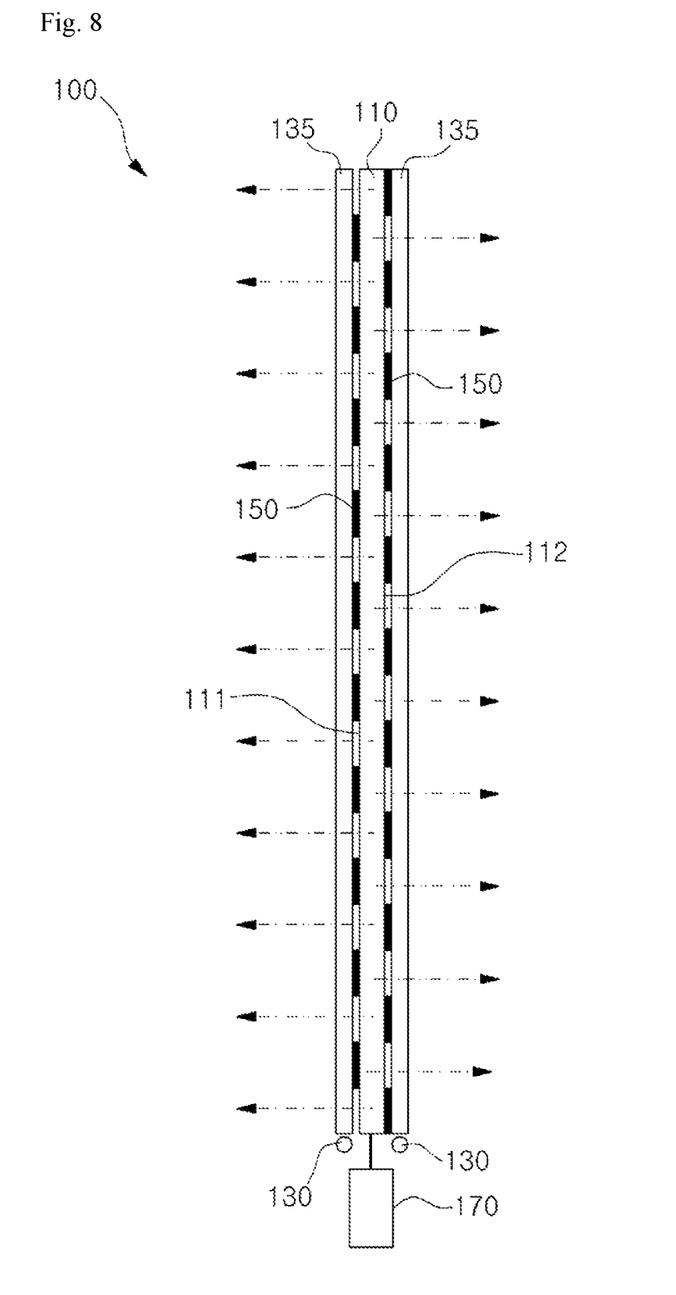
FIG. 8 is a side view schematically showing another example of a light source forming the double-sided display device of the present invention.

As shown in FIGS. 7 and 8, the double-sided display device 100 according to an embodiment of the present invention may include the light source 130.

The light source 130 may provide light to the display panel 110 so that a viewer watches a bright image.

In this case, the light source 130 may be provided depending on the type of display panel 110. For example, if the display panel 110 is an LCD panel incapable of self-emission, the light source 130 may be installed on the display panel 110 in order to provide a bright image.

Meanwhile, as in the light source 130 may be provided on one of the front side 111 and back side 112 of the display panel 110 as in one embodiment or may be provided on each of the front side 111 and the back side 112 as in another embodiment.

Furthermore, the light source 130 may be implemented using an LED or a CCFL. The light source 130 may include a light guide plate 135.

The light guide plate 135 may uniformly diffuse light provided by the light source 130 and provide the diffused light to the display panel 110. The light guide plate 135 may be installed on any one of or both the front side 111 and back side 112 of the display panel 110.

In this case, the light source 130 may be disposed on the circumference of the light guide plate 135 along a diffusion pattern formed so that the light guide plate 135 diffuses light. The diffusion pattern may be formed so that the light of the light source 130 is radiated toward the liquid crystal panel 210. The light guide plate 135 may be made of a transparent material.

In this case, a problem, such as the blurring of an image attributable to the diffusion pattern of the light guide plate when the double-sided display device 100 is viewed, can be solved only when the diffusion pattern of the light guide plate 135 has a size to the extent that it is unable to be visually recognized.

Furthermore, the light guide plate 235 may be configured to further include a diffusion sheet, a prism sheet, a protection sheet, etc. capable of switching.

Meanwhile, the light source 130 may also be implemented using a known transparent Back Light Unit (BLU) or transparent Front Light Unit (FLU).

The elements and effects according to an embodiment of the present invention are described below.

In the double-sided display device 100 according to an embodiment of the present invention, the blank means 150 is formed on one of the front side 111 and back side 112 of the display panel 110 in such a way as to cover pixels in specific pattern and the blank means 150 is installed on the other of the front side 111 and back side 112 of the display panel 110 in such a way as to cover the remaining pixels other than the specific pattern, that is, in a pattern having a form reversed in black and white with respect to the specific pattern, so that blank processing is alternately performed on the front side 111 and back side 112 of the display panel 110.

In this case, if the display panel 110 is a liquid crystal display panel incapable of self-emission, the light source 130 for providing light may be installed on any one of or both the front side 111 and back side 112 of the display panel 110.

The double-sided display device 100 having such a configuration according to an embodiment converts an image, provided by the image providing unit, through the conversion unit 170 so that the left and right of each of an image displayed in the pixel of a portion on which blank processing is not performed by the blank means 150 and an image displayed in the pixel 113 of a portion on which blank processing is performed by the blank means 150 based on any one of the front side 111 and back side 112 of the display panel 110 are reversed, and provides the converted images to the display panel 110.

Furthermore, when the image converted by the conversion unit 170 is provided to the display panel 110, a viewer can watch the image through the display panel 110.

In this case, the front side viewer of the display panel 110 may watch an image displayed on a screen including only the pixels 113 of portions on which blank processing has not been performed by the blank means 150 included in the front side 111 of the display panel 110. The back side viewer of the display panel 110 may also watch an image displayed on a screen including only the pixels 113 of portions on which blank processing has not been performed by the blank means 150 included in the back side 112 of the display panel 110.

That is, the blank means 150 provided in each of the front side 111 and back side 112 of the display panel 110 is alternately disposed in the front side and the back side in a specific pattern. Accordingly, the front side viewer and the back side viewer can watch the images on both sides through the one display panel because they watch screens through only different pixels.

Meanwhile, the light of an image displayed in the pixel 113 on which blank processing is not performed by the blank means 150 is incident on the blank means 150, and is diffused by the light diffusion unit 153 included in the blank means 150. Accordingly, an image having sharper picture quality can be watched because the boundary of an image generated due to the blank means 150 becomes obscure.

Accordingly, the double-sided display device 100 according to an embodiment of the present invention can implement the double-sided display device 100 using a single image panel and can implement the double-sided display device 100 using a relatively simple configuration, thereby being capable of significantly reducing a manufacturing cost.

Furthermore, the thickness of a double-sided display can be minimized because a single image panel is used.

Although the embodiments of the present invention have been described above, the scope of the prevent invention is not limited to the embodiments, and includes all changes and modifications which are easily changed from the embodiments of the present invention by those skilled in the art to which the present invention pertains and which are recognized as being equivalent.

INDUSTRIAL APPLICABILITY

The present invention may be used in various display industry fields having purposes of a game machine, public relations, exhibition, and advertising.

The invention claimed is:
1. A double-sided display device, comprising:
a display panel including a plurality of pixels arranged in a matrix form to display an image;
a first side of the display panel, the first side of the display panel having blank means of a pattern processed on pixels, wherein a part of an image viewed from the first side of the display is visually blocked by the blank means, and
a second side of the display opposite to the first side, the second side of the display panel having blank means of the pattern processed on remaining pixels, the remaining pixels being pixels other than pixels which have been processed by the blank means on the first side of the display, wherein a part of an image viewed from the second side of the display is visually blocked by the blank means;
a conversion unit configured to convert an image to be displayed in the pixels, the conversion of the image being performed by reversing left and right of the part of the image blocked by the blank means of the second side of the display, and not reversing the part of the image blocked by the blank means of the first side of the display, wherein the converted image is being displayed to the display panel; and
the blank means further comprising a light diffusion unit, wherein light of the image form pixels not visually blocked by the blank means on each side of the display incident on the light diffusion unit and diffuse to an outside of the blank means.

2. The double-sided display device of claim 1, wherein a line processed by the blank means from a side of the display panel and a line not processed by the blank from the same side of the display panel are alternately disposed to form the pattern of the blank.

3. The double-sided display device of claim 1, wherein the pattern is formed such that odd-numbered horizontal lines formed by pixels is processed by the blank means on one side of the display panel, and even-numbered horizontal lines formed by pixels is processed by the blank means on an opposite side of the one side of the display panel.

4. The double-sided display device of claim 1, wherein the conversion unit is configured to convert an image signal included in a scan line for displaying an image on the display panel or to convert an image itself so that a left and right of a part of the image are reversed.

5. The double-sided display device of claim 1, wherein the blank means comprises a reflection surface having a side which faces the display panel and which reflects light.

6. The double-sided display device of claim 1, wherein the blank means is coated on the display panel by paints or is bonded on the display panel by an adhesive tape.

7. The double-sided display device of claim 1, wherein: the display panel comprises a polarization plate or a film attached to the display panel, and the blank means is printed on the polarization plate or the film.

8. The double-sided display device of claim 1, further comprising a light source which is provided on any one of or both the sides of the display panel and provides light to the display panel.

9. The double-sided display device of claim 8, wherein the light source comprises a light guide plate having a diffusion pattern formed therein so that the light guide plate diffuses light of the light source and provides the diffused light to the display panel.

10. The double-sided display device of claim 9, wherein the blank means is printed on the light guide plate.

* * * * *